US011190449B2

(12) United States Patent
Shen et al.

(10) Patent No.: US 11,190,449 B2
(45) Date of Patent: Nov. 30, 2021

(54) PACKET CONTROL METHOD AND NETWORK APPARATUS

(71) Applicant: HUAWEI TECHNOLOGIES CO., LTD., Guangdong (CN)

(72) Inventors: Li Shen, Nanjing (CN); Hewen Zheng, Nanjing (CN); Hong Zhou, Nanjing (CN); Nongda Hu, Nanjing (CN); Xiang Yu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/793,136

(22) Filed: Feb. 18, 2020

(65) Prior Publication Data

US 2020/0186471 A1    Jun. 11, 2020

Related U.S. Application Data

(63) Continuation of application No. PCT/CN2018/093298, filed on Jun. 28, 2018.

(30) Foreign Application Priority Data

Aug. 18, 2017    (CN) .................. 201710713089.X

(51) Int. Cl.
*H04L 12/801* (2013.01)
*H04L 12/721* (2013.01)
(Continued)

(52) U.S. Cl.
CPC .............. *H04L 47/12* (2013.01); *H04L 45/38* (2013.01); *H04L 47/2458* (2013.01);
(Continued)

(58) Field of Classification Search
None
See application file for complete search history.

(56) References Cited

U.S. PATENT DOCUMENTS

| 2004/0066743 | A1  | 4/2004  | Shimojo et al. |
| 2008/0274747 | A1* | 11/2008 | Ludwig ............. H04W 28/0289 455/450 |

(Continued)

FOREIGN PATENT DOCUMENTS

| CN | 1426198 A  | 6/2003 |
| CN | 101299716 A | 11/2008 |

(Continued)

OTHER PUBLICATIONS

Extended European Search Report issued in European Application No. 18845599.2 dated May 12, 2020, 5 pages.

(Continued)

*Primary Examiner* — Anh Ngoc M Nguyen
(74) *Attorney, Agent, or Firm* — Fish & Richardson P.C.

(57) ABSTRACT

Example packet control methods and apparatus are described. One example method includes detecting a packet flow causing a congestion status change. A congestion isolation message is generated and is used to change a priority of a packet in the packet flow. The congestion isolation message includes description information of the packet flow. The congestion isolation message is sent to at least one node.

17 Claims, 5 Drawing Sheets

(51) Int. Cl.
    *H04L 12/833*   (2013.01)
    *H04L 12/851*   (2013.01)
    *H04L 12/841*   (2013.01)
    *H04L 12/865*   (2013.01)

(52) U.S. Cl.
    CPC .......... *H04L 47/2483* (2013.01); *H04L 47/28* (2013.01); *H04L 47/6275* (2013.01)

(56) References Cited

U.S. PATENT DOCUMENTS

| | | | |
|---|---|---|---|
| 2010/0177637 | A1 | 7/2010 | Kadambi et al. |
| 2012/0008502 | A1 | 1/2012 | Kadambi et al. |
| 2012/0134260 | A1* | 5/2012 | Chou ............... H04L 43/0882 370/225 |
| 2014/0016461 | A1* | 1/2014 | Ishikawa ............ H04L 47/35 370/230 |
| 2015/0334024 | A1* | 11/2015 | Mogul ............... H04L 47/263 370/237 |
| 2015/0350049 | A1 | 12/2015 | Yang et al. |
| 2016/0173383 | A1 | 6/2016 | Liu et al. |

FOREIGN PATENT DOCUMENTS

| | | |
|---|---|---|
| CN | 101997766 A | 3/2011 |
| CN | 102025617 A | 4/2011 |
| CN | 101325803 B | 6/2011 |
| CN | 102123444 A | 7/2011 |
| CN | 103997465 A | 8/2014 |
| CN | 104661260 A | 5/2015 |
| JP | 2000183965 A | 6/2000 |
| JP | 2003179636 A | 6/2003 |
| JP | 2007067885 A | 3/2007 |
| JP | 2016501475 A | 1/2016 |
| WO | 9900949 A1 | 1/1999 |
| WO | 2017117252 A1 | 7/2017 |

OTHER PUBLICATIONS

Lu et al., "One more queue is enough: Minimizing flow completion time with explicit priority notification," IEEE Infocom 2017—IEEE Conference on Computer Communications, XP033160319, May 2017, 9 pages.

Roy et al. "Inside the Social Network's (Datacenter) Network", Sigcomm '15, Aug. 17-21, 2015, 14 pages.

Miercom/Cisco, Speeding Applications in Data Center Networks, 2016, 21 pages.

PCT International Search Report and Written Opinion in International Application No. PCT/CN2018/093,298, dated Sep. 13, 2018, 19 pages (With English Translation).

Office Action issued in Japanese Application No. 2020-509427 dated Apr. 5, 2021, 8 pages (with English translated).

Office Action issued in Chinese Application No. 201710713089.X dated Feb. 23, 2021, 23 pages (with English translation).

\* cited by examiner

| Destination MAC address |
|---|
| Source MAC address |
| EtherType |
| IP header |
| Transport layer header |
| Padding field |
| Check field |

FIG. 3

| Destination MAC address |
|---|
| Source MAC address |
| EtherType |
| Source IP address |
| Destination IP address |
| Protocol type |
| Source port number |
| Destination port number |
| Padding field |
| Check field |

FIG. 4

PACKET CONTROL METHOD AND NETWORK APPARATUS

CROSS-REFERENCE TO RELATED APPLICATIONS

This application is a continuation of International Application No. PCT/CN2018/093298, filed on Jun. 28, 2018, which claims priority to Chinese Patent Application No. 201710713089.X, filed on Aug. 18, 2017. The disclosures of the aforementioned applications are hereby incorporated by reference in their entireties.

TECHNICAL FIELD

This application relates to the network communications field, and in particular, to a packet control method and a network apparatus.

BACKGROUND

As more services such as high-performance computing, artificial intelligence, and distributed storage depend on an ultra-low latency data center, a user requirement for a data transmission latency between nodes in the data center also increases. In actual use, a packet loss caused by congestion is an important reason that affects service performance.

To reduce a packet loss caused by congestion, a priority-based flow control (priority-based flow control, PFC) mechanism may be introduced into a data transmission process between nodes in a data center. After the PFC mechanism is introduced, an upstream node may determine, based on a priority of a to-be-transmitted service, a priority of a packet flow corresponding to each to-be-transmitted service, where a higher priority of the to-be-transmitted service indicates a higher priority of the packet flow corresponding to the to-be-transmitted service. After determining the priority of the packet flow, the upstream node may send different packet flows to a downstream node by using different sending queues, where each queue is used to send packet flows of a same priority, and different queues are used to send packet flows of different priorities. A plurality of cache queues may be correspondingly set on the downstream node. Each cache queue is correspondingly used for packet flows of a same priority, and different cache queues may be used to cache packet flows of different priorities. When data cached in a cache queue exceeds a preset horizontal line, in other words, when congestion may occur, the downstream node may send a backpressure signal to the upstream node, to request the upstream node to suspend sending of a packet flow of a priority corresponding to the cache queue, thereby avoiding congestion.

However, in a data center, one downstream node may have at least one upstream node, different types of packet flows sent by upstream nodes may have a same priority, and data volumes of packet flows of a same priority may be different. After the PFC mechanism is introduced, when a data volume of a packet flow in a plurality of packet flows of a same priority is excessively large, data cached in a cache queue may exceed a preset horizontal line, and therefore the downstream node may send a backpressure signal to the upstream node. In this case, sending the pressure signal by the downstream node to the upstream node causes all upstream nodes to suspend sending of all packet flows of the priority. Therefore, the upstream node also suspends sending of a packet flow that has a relatively small data volume and that causes no blocking, and the packet flow with a relatively small data volume has a serious problem of head of line blocking (head of line blocking, HOLB). The head of line blocking causes congestion diffusion, greatly affecting entire network performance.

SUMMARY

This application provides a packet control method and a device, to reduce head of line blocking, thereby reducing congestion diffusion.

According to a first aspect, this application provides a packet control method, including: detecting a packet flow causing a congestion status change; generating a congestion isolation message, where the congestion isolation message is used to change a priority of a packet in the packet flow, and the congestion isolation message includes description information of the packet flow; and sending the congestion isolation message to at least one node.

With reference to the first aspect, in a first possible implementation of the first aspect, the sending the congestion isolation message to at least one node includes: sending the congestion isolation message to an upstream node that sends the packet flow.

With reference to the first aspect or the first possible implementation of the first aspect, in a second possible implementation of the first aspect, the congestion isolation message is specifically used to instruct the node to reduce a scheduling priority of the packet in the packet flow.

With reference to any one of the first aspect or the first or the second possible implementation of the first aspect, in a third possible implementation of the first aspect, the congestion isolation message is a packet whose EtherType is a predefined type.

With reference to any one of the first aspect or the first to the third possible implementations of the first aspect, in a fourth possible implementation of the first aspect, content of a congestion mark item in an entry that corresponds to the packet flow and that is in a flow table is set to a first mark, where the congestion mark item is used to record whether a packet flow corresponding to an entry to which the congestion mark item belongs is a congestion flow, and the first mark is used to indicate that the packet flow corresponding to the entry to which the congestion mark item belongs is a congestion flow.

With reference to the fourth possible implementation of the first aspect, in a fifth possible implementation of the first aspect, the method further includes: if no packet in the packet flow is received within predetermined duration starting from a moment recorded by a timestamp item in the entry, setting the mark item to a second mark, where the second mark is used to indicate that the packet flow corresponding to the entry to which the mark item belongs is a non-congestion flow, and the timestamp item is used to record a moment at which a packet in the packet flow is last received.

With reference to the fourth possible implementation of the first aspect, in a sixth possible implementation of the first aspect, the method further includes: receiving a first packet; and if content of a congestion mark item in an entry that corresponds to a first packet flow and that is in the flow table is the first mark, changing a scheduling priority of the first packet, so that the priority of the first packet is different from a priority of a second packet, where both the second packet and the first packet belong to the first packet flow, the first packet is a packet received after the content of the congestion mark item is set to the first mark, and the second packet is a packet received before the content of the congestion mark item is set to the first mark.

With reference to any one of the first aspect or the first to the third possible implementations of the first aspect, in a seventh possible implementation of the first aspect, an entry corresponding to the packet flow is added to a congestion-flow flow table.

With reference to the seventh possible implementation of the first aspect, in an eighth possible implementation of the first aspect, the method further includes: if no packet in the first packet flow is received within predetermined duration starting from a moment recorded by a timestamp item in the entry, deleting the entry corresponding to the packet flow, where the timestamp item is used to record a moment at which a packet in the packet flow is last received.

With reference to the seventh possible implementation of the first aspect, in a ninth possible implementation of the first aspect, a third packet is received; and if an entry corresponding to a second packet flow exists in the congestion-flow flow table, a scheduling priority of the third packet is changed, so that the priority of the third packet is different from a priority of the fourth packet, where both the fourth packet and the third packet belong to the second packet flow, the third packet is a packet received after the entry corresponding to the second packet flow is added to the congestion-flow flow table, and the fourth packet is a packet received before the entry corresponding to the second packet flow is added to the congestion-flow flow table.

According to a second aspect, this application further provides another packet control method, including: receiving a congestion isolation message, where the congestion isolation message includes description information; and changing a priority of a packet in a packet flow indicated by the description information.

With reference to the second aspect, in a first possible implementation of the second aspect, the changing a priority of a packet in a packet flow indicated by the description information includes: reducing a scheduling priority of the packet in the packet flow.

With reference to the first possible implementation of the second aspect, in a second possible implementation of the second aspect, the reducing a scheduling priority of the packet in the packet flow includes: modifying content of a priority indication field of the packet in the packet flow, so that a scheduling priority corresponding to post-modification content is lower than a scheduling priority corresponding to the pre-modification content; or controlling the packet in the packet flow to enter a low-priority processing queue, where a scheduling priority of the low-priority processing queue is lower than a scheduling priority corresponding to content of a priority indication field of the packet in the packet flow.

With reference to the first possible implementation of the second aspect, in a third possible implementation of the second aspect, the method further includes: setting, to a first mark, content of a congestion mark item in an entry that corresponds to the packet flow and that is in a flow table, where the congestion mark item is used to record whether a packet flow corresponding to an entry to which the congestion mark item belongs is a congestion flow, and the first mark is used to indicate that the packet flow corresponding to the entry to which the congestion mark item belongs is a congestion flow.

With reference to the third possible implementation of the second aspect, in a fourth possible implementation of the second aspect, the method further includes: if no packet in the packet flow is received within predetermined duration starting from a moment recorded by a timestamp item in the entry, setting the mark item to a second mark, where the second mark is used to indicate that the packet flow corresponding to the entry to which the mark item belongs is a non-congestion flow, and the timestamp item is used to record a moment at which a packet in the packet flow is last received.

With reference to the third possible implementation of the second aspect, in a fifth possible implementation of the second aspect, the method further includes: obtaining a first packet; and if content of a congestion mark item in an entry that corresponds to a first packet flow and that is in the flow table is the first mark, changing a scheduling priority of the first packet, so that the priority of the first packet is different from a priority of a second packet, where both the second packet and the first packet belong to the first packet flow, the first packet is a packet obtained after the content of the congestion mark item is set to the first mark, and the second packet is a packet obtained before the content of the congestion mark item is set to the first mark.

With reference to the second aspect, in a sixth possible implementation of the second aspect, after the receiving a congestion isolation message, the method further includes: adding an entry corresponding to the packet flow to a congestion-flow flow table.

With reference to the sixth possible implementation of the second aspect, in a seventh possible implementation of the second aspect, the method further includes: if no packet in the packet flow is received within predetermined duration starting from a moment recorded by a timestamp item in the entry, deleting the entry corresponding to the packet flow, where the timestamp item is used to record a moment at which a packet in the packet flow is last received.

With reference to the sixth possible implementation of the second aspect, in an eighth possible implementation of the second aspect, the method further includes: obtaining a third packet; and if an entry corresponding to a second packet flow exists in the congestion-flow flow table, changing a scheduling priority of the third packet, so that the priority of the third packet is different from a priority of the fourth packet, where both the fourth packet and the third packet belong to the second packet flow, the third packet is a packet obtained after the entry corresponding to the second packet flow is added to the congestion-flow flow table, and the fourth packet is a packet obtained before the entry corresponding to the second packet flow is added to the congestion-flow flow table.

According to a third aspect, this application further provides a network device. The device includes a unit module configured to perform the method in any one of the first aspect or the implementations of the first aspect. Functions to be implemented by the unit module may be implemented by a processor or may be implemented by a processor and a network device component controlled by the processor.

According to a fourth aspect, this application further provides another network device. The device includes a unit module configured to perform the method in any one of the second aspect or the implementations of the second aspect. Functions to be implemented by the unit module may be implemented by a processor or may be implemented by a processor and a network device component controlled by the processor.

According to a fifth aspect, this application further provides a computer-readable storage medium, including an instruction. When the instruction is run on a computer, the computer may perform the method in any one of the first aspect or the implementations of the first aspect.

According to a sixth aspect, this application further provides another computer-readable storage medium, including an instruction. When the instruction is run on a computer, the computer may perform the method in any one of the second aspect or the implementations of the second aspect.

According to a seventh aspect, this application further provides a computer program product, including an instruction. When the instruction is run on a computer, the computer may perform the method in any one of the first aspect or the implementations of the first aspect.

According to an eighth aspect, this application further provides another computer program product, including an instruction. When the instruction is run on a computer, the computer may perform the method in any one of the second aspect or the implementations of the second aspect.

According to a ninth aspect, this application further provides a network system, where the network system may include at least two nodes. One node is configured to perform the method in any one of the second aspect or the implementations of the second aspect, and/or another node is configured to perform the method in any one of the second aspect or the implementations of the second aspect.

According to the method, network apparatus, and the like provided in this application, a priority of a packet in a packet flow causing a congestion status change may be changed after the packet flow is identified, thereby greatly reducing a possibility of head of line blocking.

BRIEF DESCRIPTION OF DRAWINGS

FIG. 3 is a schematic structural diagram of a congestion isolation message according to this application;

FIG. 4 is a schematic structural diagram of a congestion isolation message according to this application;

DESCRIPTION OF EMBODIMENTS

A network system in the embodiments of this application may be a data center that uses a network architecture such as a CLOS architecture, a Mesh architecture, or a Torus architecture, or may be another non-data center network that uses the foregoing architecture. This is not limited in this application. For ease of description, the following uses only a data center of the CLOS architecture as an example for description.

The data center of the CLOS architecture may include a server (server) providing various services. In addition to the server, the data center of the CLOS architecture includes a plurality of different types of switches such as a TOR switch and a SPINE switch. The TOR switch may be disposed on a link between the server and the SPINE switch. An uplink port of the TOR switch is used to connect to the SPINE switch, and a downlink port of the TOR switch is used to connect to the server. Each TOR switch may be connected to a plurality of SPINE switches by using a plurality of uplink ports. Each server may also be connected to at least one TOR switch by using at least one network interface card.

Figure 1:
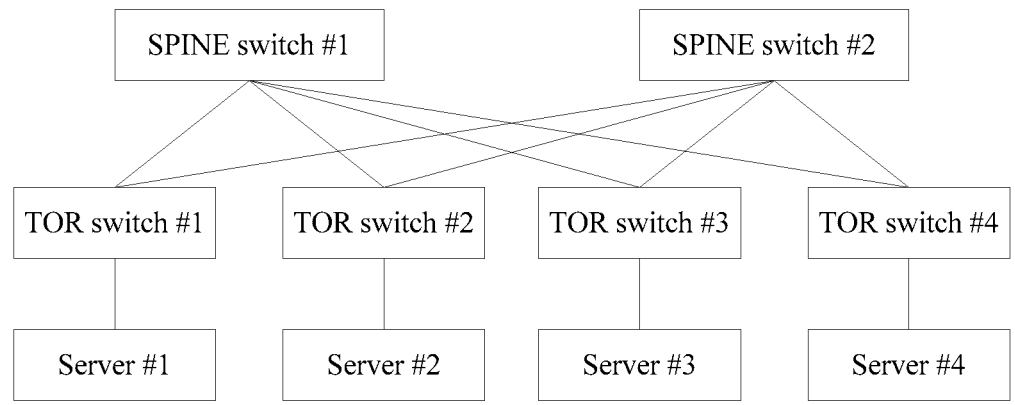
FIG. 1 is a schematic structural diagram of an embodiment of a network system according to this application.
Figure 2:
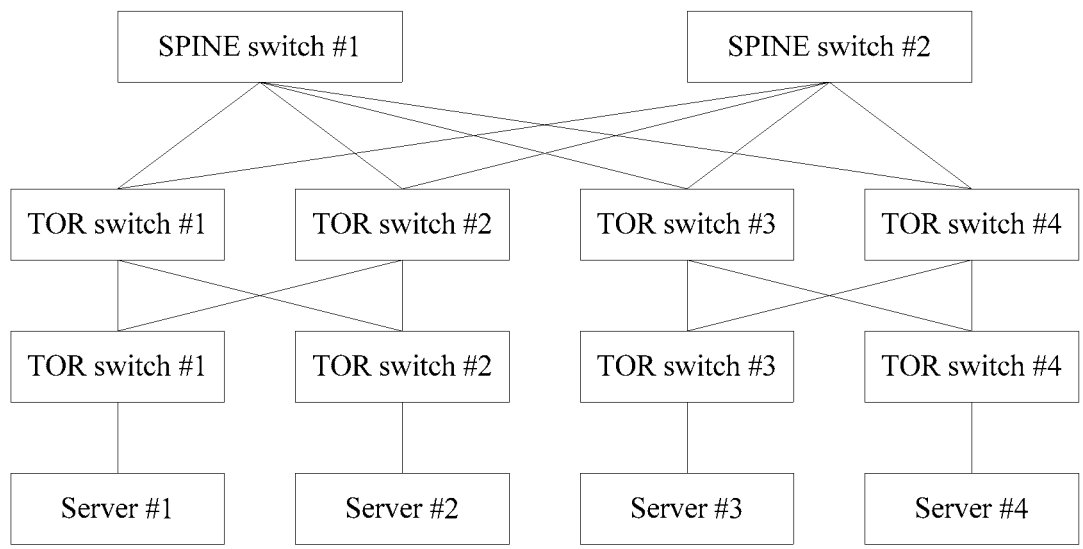
FIG. 2 is a schematic structural diagram of another embodiment of a network system according to this application.

When the data center is relatively large in size, and includes a relatively large quantity of servers and TOR switches, an AGG switch may be further disposed on a link between the TOR switch and the SPINE switch. A downlink port of the AGG switch is used to connect to at least one TOR switch, and an uplink port of the AGG switch is used to connect to at least one SPINE. When the uplink port of the TOR switch is connected to the SPINE switch, as shown in FIG. 1, the data center is a two-stage CLOS network. When the uplink port of the TOR switch is connected to the AGG switch, as shown in FIG. 2, the data center is a three-stage CLOS network.

A node in the embodiments of this application may also be referred to as a station (station), and may include a device such as the foregoing server or any type of switch, or may include any device in the data center network or the another non-data center network. The device may be a switch, a router, a network interface card, or another device.

In the embodiments of this application, a congestion isolation message (congestion isolation packet, CIP) is information that can be used to instruct a node that receives the message to change a priority of a packet in a packet flow indicated by the message. That is, the congestion isolation message may be used to instruct the node that receives the message to change the priority of the packet in the packet flow. The packet flow is indicated by description information or another information included in the congestion isolation message.

The description information is information or an information combination that may be used to determine a packet flow. By using the description information, the node may determine only one packet flow corresponding to the description information. For example, the packet flow may be a 5-tuple (5-tuple) including a source IP, a destination IP, a protocol number, a source port number, and a destination port number of the packet flow, or may be a 3-tuple, or another type of information or information combination. For example, in an overlay network such as a VXLAN, packet flows of different tenants may have a same 5-tuple. Therefore, a packet flow cannot be uniquely determined by using the 5-tuple. In this case, a VNI (VXLAN Network Identifier) also needs to be used as description information of a flow, in other words, a 6-tuple is used to uniquely determine a packet flow. This is not limited in this application.

A destination MAC address of a congestion isolation message is a MAC address of a node that receives the congestion isolation message, a source MAC address of the congestion isolation message is a MAC address of a node that sends the congestion isolation message, and an EtherType of the congestion isolation message may be a predefined type used to indicate that the packet is a congestion isolation message, for example, 0x8809. The description information of the flow may be included in an IP header and a transport layer header of the congestion isolation message. To simplify processing logic, the IP header and the transport layer header of the congestion isolation message may be in a standard format, in other words, have a same format as the packet in the packet flow. During construction of the congestion isolation message, an IP header and a transport layer header of the packet in the packet flow may be copied, an Ethernet header is encapsulated for the copied IP header and transport layer header of the packet in the packet flow, and a packet is padded to reach a minimum Ethernet packet length of 64 bytes. For example, a format of the congestion isolation message may be shown in FIG. 3. It should be noted that the congestion isolation message may be alternatively in another format or constructed in another manner. When this application is applied to another non-Ethernet network such as an InfiniBand network, a message is a message of a self-defined InfiniBand protocol type, provided that description information of a packet flow is included. This is not limited in this application. For example, a format of the congestion isolation message may be alternatively shown in FIG. 4.

In the embodiments of this application, a congestion-flow flow table that is exclusively used to record a congestion flow may be set on each node, and a packet flow causing a congestion status change is recorded by using an entry in the congestion-flow flow table. The packet flow causing a congestion status change may include but is not limited to a congestion flow. If an entry corresponding to a packet flow exists in the congestion-flow flow table, it indicates that the packet flow is a packet flow causing a congestion status change. If no entry corresponding to the packet flow exists in the congestion-flow flow table, it indicates that the packet flow is not a packet flow causing a congestion status change. The entry may include a timestamp item, and the timestamp item is used to record a moment at which a packet in the packet flow is last received.

Alternatively, each node may set a congestion mark item for each entry in an existing flow table to record a packet flow causing a congestion status change. The congestion mark item may be used to record, by using different content, whether a packet flow corresponding to an entry to which the congestion mark item belongs is a congestion flow. Content of the congestion mark item may be a first mark or a second mark. The first mark is used to indicate that the packet flow corresponding to the entry to which the congestion mark item belongs is a congestion flow, and the second mark is used to indicate that the packet flow corresponding to the entry to which the congestion mark item belongs is not a congestion flow. In addition to the congestion mark item, a timestamp item may also be set for each entry in the flow table.

In the embodiments of this application, there may be different types of processing queues such as a sending queue, a forwarding queue, and a cache queue. Priorities of packets in a same queue are the same, and priorities of packets in different queues may be different, or priorities of packets in several of different queues may be the same. For example, the processing queue may be any one of eight cache queues used to cache a packet sent by an upstream node, or may be any one of sub-queues in the cache queue.

The following describes a packet control method in this application with reference to the accompanying drawings.

Figure 5:
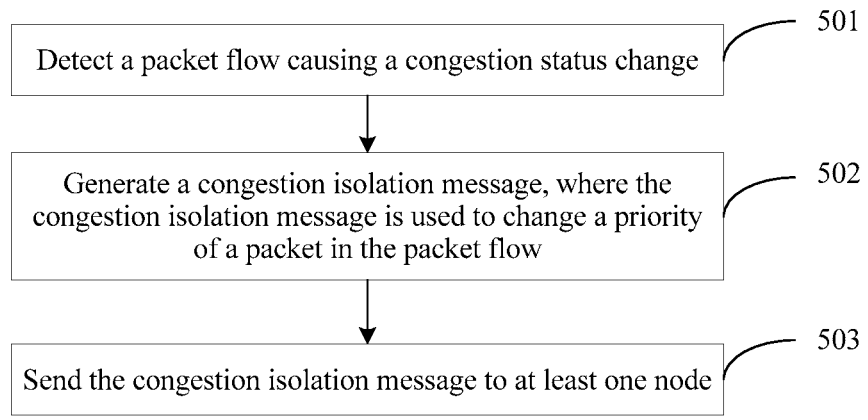
FIG. 5 is a schematic flowchart of an embodiment of a packet control method according to this application.

FIG. 5 is a schematic flowchart of an embodiment of a packet control method according to this application. The method in this embodiment may be performed by any node. As shown in FIG. 5, the method may include the following steps.

Step 501: Detect a packet flow causing a congestion status change.

The packet flow causing a congestion status change may be a packet flow that causes congestion or may cause congestion in a processing queue of a current node, or may be a packet flow that causes congestion or may cause congestion in a processing queue of another node such as an upstream node or a downstream node of a current node. Depending on different nodes that are congested or may be congested, specific manners of determining the packet flow causing a congestion status change are different. In an example in which a congestion flow of the current node is to be determined, a single-waterline mechanism or a dual-waterline mechanism may be used to determine whether a packet flow is a congestion flow.

When the single-waterline mechanism is used to determine a congestion flow, after a packet in a packet flow is added to a processing queue, if a quantity of packets that queue for processing in the processing queue exceeds a preset waterline, it may be determined that the packet flow is a congestion flow, or otherwise, the packet flow is not a congestion flow.

When the dual-waterline mechanism is used to determine a congestion flow, after a packet in a packet flow is added to a processing queue, if a quantity of packets that queue for processing in the processing queue exceeds a preset high waterline, it may be determined that the packet flow is a congestion flow. If a quantity of packets that queue for processing in the processing queue exceeds a preset low waterline but does not exceed a preset high waterline, it may be determined, based on a probability, whether the packet flow is a congestion flow. The probability may be obtained by multiplying a variable by a preset value. The variable may be a value obtained by dividing a difference by the preset high waterline minus the preset low waterline, where the difference is obtained by subtracting the preset low waterline from a current queuing data volume. If a quantity of packets that queue for processing in the processing queue does not exceed a preset low waterline, the packet flow is not a congestion flow.

The packet flow causing a congestion status change may be a packet flow that causes congestion or may cause congestion in a processing queue of the current node, or may be a packet flow that causes congestion or may cause congestion in a processing queue of another node such as a downstream node of the current node or a downstream node of the downstream node. Depending on different nodes that are congested or may be congested, specific manners of determining the packet flow causing a congestion status change are different. For example, if the packet flow causes a change in a congestion status of the downstream node of the current node, the downstream node may send a congestion isolation message to the current node, and the current node may determine the packet flow based on description information in the congestion isolation message. A similar method is not described herein.

Step 502: Generate a congestion isolation message.

After detecting the packet flow, the current node may construct the congestion isolation message. The congestion isolation message is used to change a priority of a packet in the packet flow. Generally, the congestion isolation message is used to instruct a node that receives the message to reduce a scheduling priority of the packet in the packet flow. For a construction manner of the congestion isolation message, refer to the foregoing description. Details are not described herein again.

Step 503: Send the congestion isolation message to at least one node.

After generating the congestion isolation message, the current node may send the congestion isolation message to the at least one node. The at least one node may include an upstream node that sends the packet flow to the current node, and in this case, the current node may send the congestion isolation message to the upstream node that sends the packet flow. After receiving the congestion isolation message, the upstream network node may change a priority of the packet flow, to implement congestion flow isolation.

According to the method provided in this application, when a congestion status changes, the current node may identify a packet flow causing a congestion status change, and instruct another node to change a priority of a packet in the packet flow without affecting transmission of another packet flow. Therefore, a packet loss caused by congestion can be avoided, and head of line blocking caused by no congestion isolation can be avoided to a large extent, avoiding congestion diffusion.

To change the scheduling priority of the packet to avoid congestion, the current node not only needs to send the congestion isolation message, but also needs to isolate, at the current node, the packet in the packet flow causing a congestion status change, to prevent a queue that is of the current node or the downstream node and that corresponds to an unchanged priority from continuing to be congested.

The current node may modify content of a priority indication field of the packet in the packet flow, so that a scheduling priority corresponding to post-modification content is lower than a scheduling priority corresponding to the pre-modification content; or control the packet in the packet flow to enter a low-priority processing queue, where a scheduling priority of the low-priority processing queue is lower than a scheduling priority corresponding to content of a priority indication field of the packet in the packet flow, to isolate the packet in the packet flow causing a congestion status change. The low-priority queue may be a queue of a predetermined priority, and the first-priority queue may be one queue with a lowest priority, or one or more of several queues with a lowest priority of a plurality of processing queues of the current node. Modifying the content of the priority indication field of the packet in the packet flow, so that the scheduling priority corresponding to the post-modification content is lower than the scheduling priority corresponding to the pre-modification content may be implemented by modifying the content of the priority field of the packet, or may be implemented by modifying other information used to indicate the priority of the packet. For example, the content of the priority field may be modified to new content with a priority lower than a priority indicated by the original content, in other words, the scheduling priority corresponding to the post-modification content is lower than the scheduling priority corresponding to the pre-modification content.

Reducing the scheduling priority of the packet in the packet flow may be reducing only a priority of a packet that is in the packet flow and that has not been added to a processing queue, or may be reducing both a priority of a packet that is in the packet flow and that has not been added to a processing queue and a priority of a packet that is in the packet flow and that has been added to a processing queue but that has not been processed. Similarly, controlling the packet in the packet flow to enter the low-priority processing queue, where the scheduling priority of the low-priority processing queue is lower than the scheduling priority corresponding to the content of the priority indication field of the packet in the packet flow may be controlling only the packet in the packet flow to enter the low-priority processing queue, where the scheduling priority of the low-priority processing queue is lower than the scheduling priority corresponding to the content of the priority indication field of the packet in the packet flow; or may be controlling the packet in the packet flow to enter the low-priority processing queue, and scheduling a packet that is in the packet flow and that has been added to a processing queue but has not been processed to the low-priority processing queue, where the scheduling priority of the low-priority processing queue is lower than the scheduling priority corresponding to the content of the priority indication field of the packet in the packet flow.

The following describes specific manners of modifying the content of the priority indication field of the packet in the packet flow, so that the scheduling priority corresponding to the post-modification content is lower than the scheduling priority corresponding to the pre-modification content. It should be noted herein that the following embodiments are merely optional manners of modifying the content of the priority indication field of the packet in the packet flow, so that the scheduling priority corresponding to the post-modification content is lower than the scheduling priority corresponding to the pre-modification content, but do not constitute any limitation to another implementation. Depending on different manners of recording the packet flow by using different flow tables, specific implementations of reducing the scheduling priority of the packet in the packet flow by the current node are also different.

Figure 6:
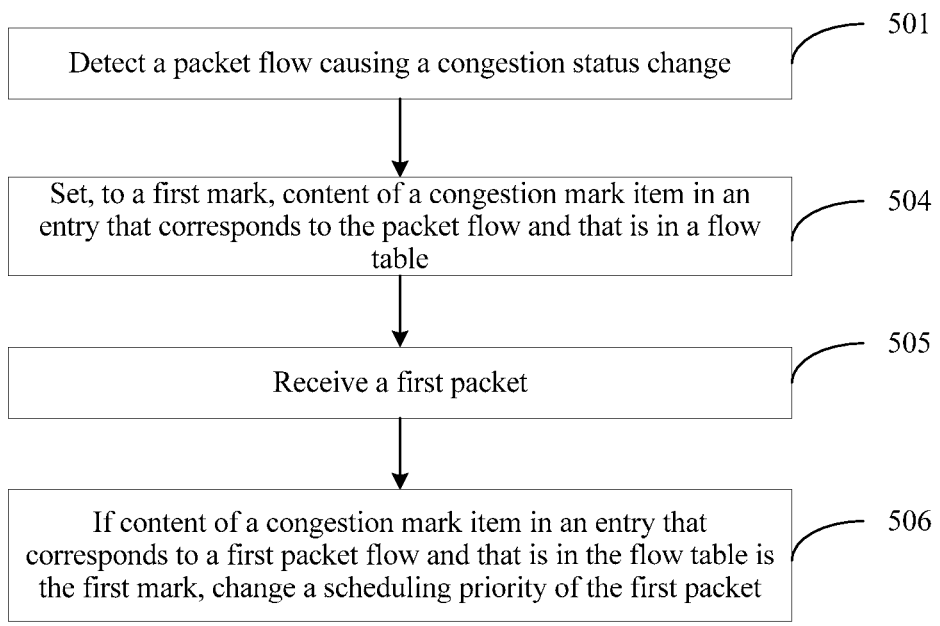
FIG. 6 is a schematic flowchart of another embodiment of a packet control method according to this application.

FIG. 6 is a schematic flowchart of another embodiment of a packet control method according to this application. As shown in FIG. 6, after step 501, that is, after the packet flow causing a congestion status change is detected, the method may further include the following steps.

Step 504: Set, to a first mark, content of a congestion mark item in an entry that corresponds to the packet flow and that is in a flow table.

To facilitate restoration of the priority of the packet in the data flow, in addition to setting the content of the congestion mark item to the first mark, content of a timestamp item in the entry corresponding to the packet flow may be set to a moment at which a packet in the packet flow is last received.

Step 505: Receive a first packet.

The first packet may be a packet sent by any upstream node of the current node.

Step 506: If content of a congestion mark item in an entry that corresponds to a first packet flow and that is in the flow table is the first mark, change a scheduling priority of the first packet.

After receiving the first packet, the current node may determine the first packet flow to which the first packet belongs, and then detect whether the first packet flow has been recorded as a packet flow causing a congestion status change. If the first packet flow has been recorded as a packet flow causing a congestion status change, the scheduling priority of the first packet is changed. Specifically, in this embodiment, if the content of the congestion mark item in the entry that corresponds to the first packet flow and that is in the flow table is the first mark, it indicates that the first packet flow is a packet flow causing a congestion status change, and therefore the scheduling priority of the first packet needs to be changed.

The current node may change the priority of the first packet, so that the priority of the first packet is different from a priority of a second packet, thereby implementing congestion flow isolation at the current node. Both the second packet and the first packet belong to the first packet flow, the first packet is a packet received after the content of the congestion mark item is set to the first mark, and the second packet is a packet received before the content of the congestion mark item is set to the first mark. It should be noted herein that changing the scheduling priority of the first packet may usually be reducing the priority of the first packet.

There may be a plurality of specific implementations of changing the scheduling priority of the first packet. The specific implementations may usually include: modifying content of a priority indication field of the packet in the packet flow, so that a scheduling priority corresponding to post-modification content is lower than a scheduling priority corresponding to the pre-modification content; or controlling the packet in the packet flow to enter a low-priority processing queue, where a scheduling priority of the low-priority processing queue is lower than a scheduling priority corresponding to content of a priority indication field of the packet in the packet flow.

For example, before adding the first packet to a processing queue, the current node may change content that is used to indicate the priority of the first packet and that is in the first packet, for example, change content in a priority field of the first packet, so that a processing queue to which the first packet is added according to the indication information is different from a processing queue to which the second packet is added, thereby changing the priority of the first packet. Alternatively, the current node may directly control the first packet to be added to a queue of a different priority from a queue to which the second packet is added, thereby changing the priority of the first packet.

It should be noted herein that after step 502, the method may further include: if no packet in the packet flow is received within predetermined duration starting from a moment recorded by a timestamp item in the entry, setting the mark item to a second mark.

If no packet in the packet flow is received within the predetermined duration starting from the moment recorded by the timestamp item in the entry, it indicates that packets in the packet flow are reduced, and the packet flow may no longer be considered as a congestion flow. Therefore, the current node may set the mark item to the second mark, so that when a packet in the packet flow is subsequently received, the priority of the packet in the packet flow can be restored. The predetermined duration may not be longer than duration of clearing the flow table.

In this embodiment, congestion flow isolation can be implemented at the current node.

Figure 7:
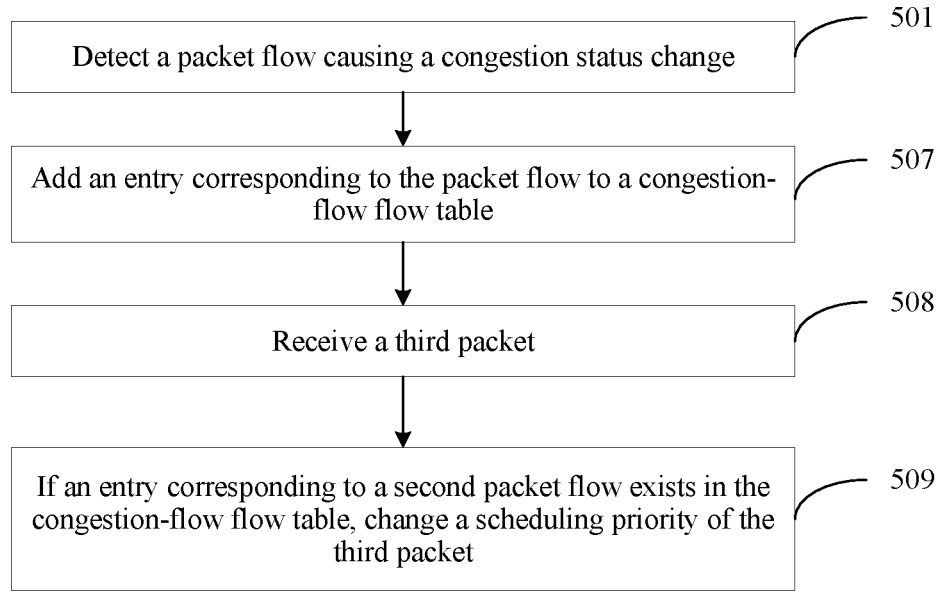
FIG. 7 is a schematic flowchart of still another embodiment of a packet control method according to this application.

FIG. 7 is a schematic flowchart of another embodiment of a packet control method according to this application. As shown in FIG. 7, after step 501, that is, after the packet flow causing a congestion status change is detected, the method may further include the following steps.

Step 507: Add an entry corresponding to the packet flow to a congestion-flow flow table.

To facilitate restoration of the priority of the packet in the data flow, in addition to adding the entry to the congestion-flow flow table, content of a timestamp item in the entry may be set to a moment at which a packet in the packet flow is last received.

Step 508: Receive a third packet.

The third packet may be a packet sent by any upstream node of a current node.

Step 509: If an entry corresponding to a second packet flow exists in the congestion-flow flow table, change a scheduling priority of the third packet.

If the entry corresponding to the second packet flow exists in the congestion-flow flow table, it indicates that the second packet flow is a packet flow causing a congestion status change, and therefore a priority of the third packet needs to be changed.

The current node may change the priority of the third packet, so that a priority of the third packet is different from the priority of the fourth packet, where both the fourth packet and the third packet belong to the second packet flow, the third packet is a packet received after the entry corresponding to the second packet flow is added to the congestion-flow flow table, and the fourth packet is a packet received before the entry corresponding to the second packet flow is added to the congestion-flow flow table.

A specific implementation of changing the scheduling priority of the third packet is similar to the manner of changing the priority of the first packet. Details are not described herein again.

It should be noted herein that after step 507, the method may further include: if no packet in the packet flow is obtained within predetermined duration starting from the moment recorded by the timestamp item in the entry, deleting the entry corresponding to the packet flow.

If no packet in the packet flow is received within the predetermined duration starting from the moment recorded by the timestamp item in the entry, it indicates that packets in the packet flow are reduced, and the packet flow may no longer be considered as a congestion flow. Therefore, the entry that corresponds to the packet flow and that is in the congestion-flow flow table may be deleted, to restore the priority of the packet in the packet flow.

In this embodiment, congestion flow isolation can also be implemented at the current node.

To avoid a packet loss caused by congestion, congestion flow isolation needs to be implemented at an upstream node in addition to being implemented at the current node.

Figure 8:
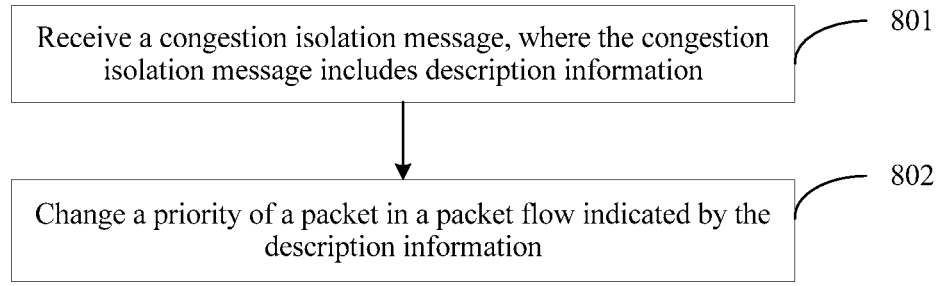
FIG. 8 is a schematic flowchart of yet another embodiment of a packet control method according to this application.

FIG. 8 is a schematic flowchart of another embodiment of a packet control method according to this application. The method shown in this embodiment may be performed by an upstream network node.

Step 801: Receive a congestion isolation message, where the congestion isolation message includes description information.

The upstream node may receive the congestion isolation message sent by the current node in the foregoing embodiments. For related content of the congestion isolation message, refer to the foregoing embodiments. Details are not described herein again.

After receiving the congestion isolation message, the upstream node may further set, to a first mark, content of a congestion mark item in an entry that corresponds to the packet flow and that is in a flow table, or add an entry corresponding to the packet flow to a congestion-flow flow table. For a specific manner, refer to the foregoing embodiments. Details are not described herein again.

Step 802: Change a priority of a packet in the packet flow indicated by the description information.

After receiving the congestion isolation message, the upstream node may first determine, based on the description information, the packet flow indicated by the description information, and then change the priority of the packet in the packet flow indicated by the description information.

Because a congestion flow often exists in the packet flow, changing the priority of the packet in the packet flow indicated by the description information is usually reducing a scheduling priority of the packet in the packet flow. Similar to the current node, the upstream node may reduce the scheduling priority of the packet in the packet flow in the following manner: modifying content of a priority indication field of the packet in the packet flow, so that a scheduling priority corresponding to post-modification content is lower than a scheduling priority corresponding to the pre-modification content; or controlling the packet in the packet flow to enter a low-priority processing queue, where a scheduling priority of the low-priority processing queue is lower than a scheduling priority corresponding to content of a priority indication field of the packet in the packet flow. Depending on different manners of recording the packet flow, manners of changing the priority of the packet in the packet flow by the upstream node are also different.

After obtaining a packet, the upstream node may detect whether a packet flow to which the packet belongs is a packet flow that has been recorded as a packet flow causing a congestion status change. If the packet flow has been recorded as a packet flow causing a congestion status change, a priority of the packet is changed. The packet may be sent by another node to the upstream node, or may be generated by the upstream node.

In an implementation, the upstream node may first obtain a first packet, and after obtaining the first packet, the upstream node may determine a first packet flow to which the first packet belongs. If content of a congestion mark item in an entry that corresponds to the first packet flow and that is in the flow table is the first mark, a scheduling priority of the first packet is changed. For a specific implementation of changing the priority of the first packet, refer to the foregoing description. Details are not described herein again.

In another implementation, the upstream node may first obtain a third packet, and after obtaining the third packet, the upstream node may determine a second packet flow to which the third packet belongs. If an entry corresponding to the second packet flow exists in the congestion-flow flow table, a priority of the third packet is changed. For a specific implementation of changing the priority of the third packet, refer to the foregoing description. Details are not described herein again.

The packet in the packet flow indicated by the description information may be sent by another node to the upstream node. Therefore, after the upstream node receives the congestion isolation message, if the upstream node detects that the packet in the packet flow indicated by the description information is sent by another node to the upstream node, the upstream node may further send a congestion isolation message to the node. For a manner of the congestion isolation message and a manner after the node receives the congestion isolation message, refer to the foregoing description. Details are not described herein again.

Corresponding to the method provided in the foregoing embodiments, this application further provides a corresponding network device.

Figure 9:
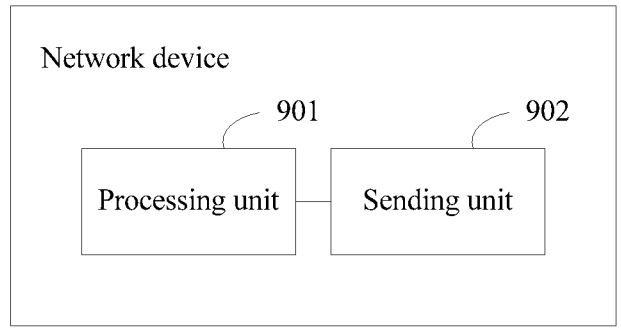
FIG. 9 is a schematic structural diagram of an embodiment of a network device according to this application.

FIG. 9 is a schematic structural diagram of an embodiment of a network device according to this application. The network device may be disposed on the node in the foregoing embodiment, or may be the node.

As shown in FIG. 9, the network device may include: a processing unit 901, configured to: detect a packet flow causing a congestion status change; and generate a congestion isolation message, where the congestion isolation message is used to change a priority of a packet in the packet flow, and the congestion isolation message includes description information of the packet flow; and a sending unit 902, configured to send the congestion isolation message to at least one node.

Optionally, the sending unit 902 is specifically configured to send the congestion isolation message to an upstream node that sends the packet flow, where the congestion isolation message is specifically used to instruct the node to reduce a scheduling priority of the packet in the packet flow.

Optionally, the congestion isolation message is a packet whose EtherType is a predefined type.

Optionally, the processing unit 901 is further configured to reduce the scheduling priority of the packet in the packet flow.

Optionally, the processing device is specifically configured to: modify content of a priority indication field of the packet in the packet flow, so that a scheduling priority corresponding to post-modification content is lower than a scheduling priority corresponding to the pre-modification content; or control the packet in the packet flow to enter a low-priority processing queue, where a scheduling priority of the low-priority processing queue is lower than a scheduling priority corresponding to content of a priority indication field of the packet in the packet flow.

Optionally, the processing unit 901 is further configured to set, to a first mark, content of a congestion mark item in an entry that corresponds to the packet flow and that is in a flow table, where the congestion mark item is used to record whether a packet flow corresponding to an entry to which the congestion mark item belongs is a congestion flow, and the first mark is used to indicate that the packet flow corresponding to the entry to which the congestion mark item belongs is a congestion flow.

Optionally, the processing unit 901 is further configured to: if no packet in the packet flow is received within predetermined duration starting from a moment recorded by a timestamp item in the entry, set the mark item to a second mark, where the second mark is used to indicate that the packet flow corresponding to the entry to which the mark item belongs is a non-congestion flow, and the timestamp item is used to record a moment at which a packet in the packet flow is last received.

Optionally, the network device further includes a receiving unit, configured to receive a first packet. The processing unit 901 is further configured to: if content of a congestion mark item in an entry that corresponds to a first packet flow and that is in the flow table is the first mark, change a scheduling priority of the first packet, so that the priority of the first packet is different from a priority of a second packet, where both the second packet and the first packet belong to the first packet flow, the first packet is a packet received after the content of the congestion mark item is set to the first mark, and the second packet is a packet received before the content of the congestion mark item is set to the first mark.

Optionally, the device further includes a receiving unit, configured to receive a first packet. The processing unit 901 is further configured to: if content of a congestion mark item in an entry that corresponds to a first packet flow and that is in the flow table is the first mark, change a scheduling priority of the first packet, so that the priority of the first packet is different from a priority of a second packet, where both the second packet and the first packet belong to the first packet flow, the first packet is a packet received after the content of the congestion mark item is set to the first mark, and the second packet is a packet received before the content of the congestion mark item is set to the first mark.

Optionally, the processing unit 901 is further configured to add an entry corresponding to the packet flow to a congestion-flow flow table.

Optionally, the processing unit 901 is further configured to: if no packet in the packet flow is received within predetermined duration starting from a moment recorded by a timestamp item in the entry, delete the entry corresponding to the packet flow, where the timestamp item is used to record a moment at which a packet in the packet flow is last received.

Optionally, the device further includes a receiving unit, configured to receive a third packet. The processing unit 901 is further configured to: if an entry corresponding to a second packet flow exists in the congestion-flow flow table, change a scheduling priority of the third packet, so that the priority of the third packet is different from a priority of the fourth packet, where both the fourth packet and the third packet belong to the second packet flow, the third packet is a packet received after the entry corresponding to the second packet flow is added to the congestion-flow flow table, and the fourth packet is a packet received before the entry corresponding to the second packet flow is added to the congestion-flow flow table.

Figure 10:
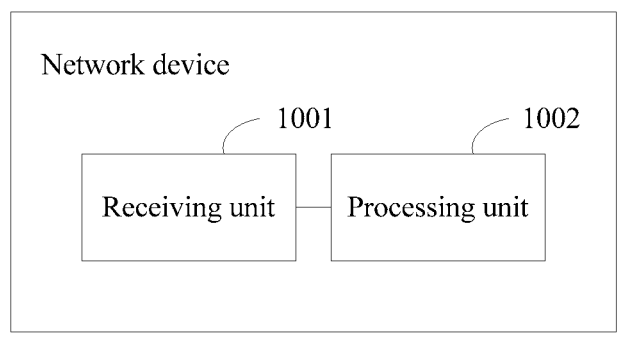
FIG. 10 is a schematic structural diagram of another embodiment of a network device according to this application.

FIG. 10 is a schematic structural diagram of an embodiment of a network device according to this application. The network device may be disposed on the node in the foregoing embodiment, or may be the node.

As shown in FIG. 10, the network device may include: a receiving unit 1001, configured to receive a congestion isolation message, where the congestion isolation message includes description information; and a processing unit 1002, configured to change a priority of a packet in a packet flow indicated by the description information.

Optionally, the processing unit 1002 is further configured to reduce a scheduling priority of the packet in the packet flow.

Optionally, the processing unit 1002 is further configured to: modify content of a priority indication field of the packet in the packet flow, so that a scheduling priority corresponding to post-modification content is lower than a scheduling priority corresponding to the pre-modification content; or control the packet in the packet flow to enter a low-priority processing queue, where a scheduling priority of the low-priority processing queue is lower than a scheduling priority corresponding to content of a priority indication field of the packet in the packet flow.

Optionally, the processing unit 1002 is further configured to set, to a first mark, content of a congestion mark item in an entry that corresponds to the packet flow and that is in a flow table, where the congestion mark item is used to record whether a packet flow corresponding to an entry to which the congestion mark item belongs is a congestion flow, and the first mark is used to indicate that the packet flow corresponding to the entry to which the congestion mark item belongs is a congestion flow.

Optionally, the processing unit 1002 is further configured to: if no packet in the packet flow is received within predetermined duration starting from a moment recorded by a timestamp item in the entry, set the mark item to a second mark, where the second mark is used to indicate that the packet flow corresponding to the entry to which the mark item belongs is a non-congestion flow, and the timestamp item is used to record a moment at which a packet in the packet flow is last received.

Optionally, the device further includes the receiving unit 1001, further configured to obtain a first packet. The processing unit 1002 is further configured to: if content of a congestion mark item in an entry that corresponds to a first packet flow and that is in the flow table is the first mark, change a scheduling priority of the first packet, so that the priority of the first packet is different from a priority of a second packet, where both the second packet and the first packet belong to the first packet flow, the first packet is a packet obtained after the content of the congestion mark item is set to the first mark, and the second packet is a packet obtained before the content of the congestion mark item is set to the first mark.

Optionally, the processing unit 1002 is further configured to add an entry corresponding to the packet flow to a congestion-flow flow table.

Optionally, the processing unit 1002 is further configured to: if no packet in the packet flow is received within predetermined duration starting from a moment recorded by a timestamp item in the entry, delete the entry corresponding to the packet flow, where the timestamp item is used to record a moment at which a packet in the packet flow is last received.

Optionally, the receiving unit 1001 is further configured to obtain a third packet. The processing unit 1002 is further configured to: if an entry corresponding to a second packet flow exists in the congestion-flow flow table, change a scheduling priority of the third packet, so that the priority of the third packet is different from a priority of the fourth packet, where both the fourth packet and the third packet belong to the second packet flow, the third packet is a packet obtained after the entry corresponding to the second packet flow is added to the congestion-flow flow table, and the fourth packet is a packet obtained before the entry corresponding to the second packet flow is added to the congestion-flow flow table.

Figure 11:
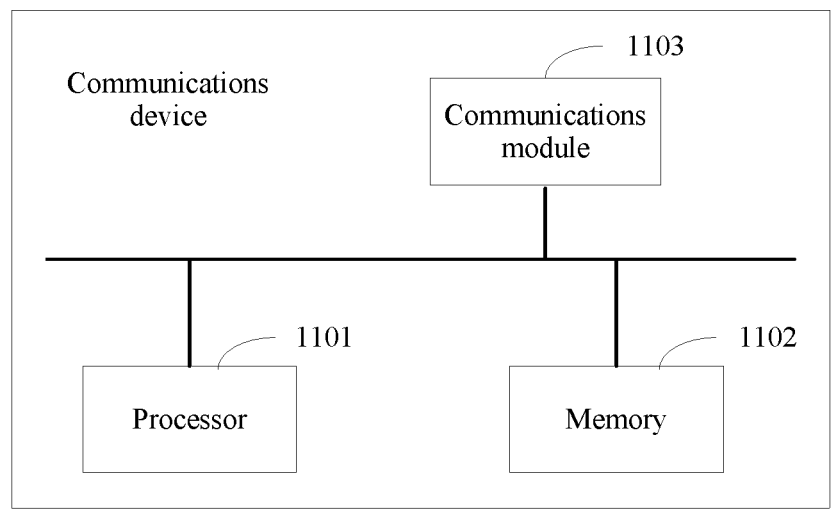
FIG. 11 is a schematic structural diagram of still another embodiment of a network device according to this application.

FIG. 11 is a schematic structural diagram of still another embodiment of a network device according to this application. As shown in FIG. 11, the network device may include a processor 1101, and may further include a memory 1102 and a communications module 1103.

As a control center of the device, the processor 1101 is connected to various parts of the entire device by using various interfaces and lines, and performs various functions and/or data processing of the device by running or executing a software program and/or a module stored in the memory 1102 and invoking data stored in the memory 1102. The processor 1101 may be a central processing unit (central processing unit, CPU), a network processor (network processor, NP), or a combination of a CPU and an NP. The processor 1101 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof.

The memory 1102 may include a volatile memory (volatile memory), for example, a random access memory (random access memory, RAM), or may include a non-volatile memory (non-volatile memory), for example, a flash memory (flash memory), a hard disk (hard disk drive, HDD), or a solid-state drive (solid-state drive, SSD). The memory may further include a combination of the foregoing types of memories. The memory 1102 may store an instruction, a program, or code, and the processor 1101 of the device may implement a function of the device by executing the program or the code.

The communications module 1103 may be configured to implement communication between the device and another device. In the embodiments of this application, the communications module 1103 may be a module configured to provide an Ethernet port, so that the device can communicate with another device over Ethernet. For example, when the device is a server, the communications module 1103 may be a network interface card.

The processor 1101 may be configured to: detect a packet flow causing a congestion status change; generate a congestion isolation message, where the congestion isolation message is used to change a priority of a packet in the packet flow, and the congestion isolation message includes description information of the packet flow; and send the congestion isolation message to at least one node. Alternatively, the processor 1101 may be configured to change, based on description information included in a received congestion isolation message, a priority of a packet in a packet flow indicated by the description information. For a function to be implemented or a step of a method to be performed by the processor 1101, refer to the foregoing embodiments. Details are not described herein again.

It should be noted herein that all or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the foregoing embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired manner, for example, a coaxial cable, an optical fiber, or a digital subscriber line (DSL), or in a wireless manner, for example, infrared, radio, or microwave. The computer-readable storage medium may be any usable medium accessible by a computer, or a data storage device, such as a server or a data center, integrating one or more usable media. The usable medium may be a magnetic medium such as a floppy disk, a hard disk, or a magnetic tape, an optical medium such as a DVD, a semiconductor medium such as a solid-state drive (solid state disk, SSD), or the like.

For same or similar parts in the embodiments in this specification, refer to each other. Especially, the embodiments relating to the network apparatus and device are basically similar to the method embodiments, and therefore are described briefly. For related parts, refer to descriptions in the method embodiments.

The implementations of this application described above are not intended to limit the protection scope of this application.

What is claimed is:

1. A packet control method, comprising:
   detecting, by a network node, a packet flow causing a congestion status change;
   reducing, by the network node, a scheduling priority of a packet in the packet flow of the network node, wherein the packet in the packet flow is received from an upstream node;
   generating, by the network node, a congestion isolation message, wherein the congestion isolation message is used to instruct the upstream node to reduce a scheduling priority of the packet in the packet flow, and wherein the congestion isolation message comprises description information of the packet flow; and
   sending, by the network node, the congestion isolation message to the upstream node.

2. The method according to claim 1, wherein the reducing a scheduling priority of the packet in the packet flow comprises:
   modifying content of a priority indication field of the packet in the packet flow, wherein a scheduling priority corresponding to post-modification content is lower than a scheduling priority corresponding to pre-modification content; or
   controlling the packet in the packet flow to enter a low-priority processing queue, wherein a scheduling priority of the low-priority processing queue is lower than a scheduling priority corresponding to content of a priority indication field of the packet in the packet flow.

3. The method according to claim 1, further comprising:
   setting, to a first mark, content of a congestion mark item in an entry that corresponds to the packet flow and that is in a flow table, wherein the congestion mark item is used to record whether a packet flow corresponding to an entry to which the congestion mark item belongs is a congestion flow, and wherein the first mark is used to indicate that the packet flow corresponding to the entry to which the congestion mark item belongs is a congestion flow.

4. The method according to claim 3, further comprising:
   in response to determining that no packet in the packet flow is received within predetermined duration starting from a moment recorded by a timestamp item in the entry, setting the congestion mark item to a second mark, wherein the second mark is used to indicate that the packet flow corresponding to the entry to which the congestion mark item belongs is a non-congestion flow, and wherein the timestamp item is used to record a moment at which a packet in the packet flow is last received.

5. The method according to claim 3, further comprising:
   receiving a first packet; and
   in response to determining that content of a congestion mark item in an entry that corresponds to a first packet flow and that is in the flow table is the first mark, changing a scheduling priority of the first packet, wherein the scheduling priority of the first packet is different from a scheduling priority of a second packet, wherein both the second packet and the first packet belong to the first packet flow, wherein the first packet is a packet received after the content of the congestion mark item is set to the first mark, and wherein the second packet is a packet received before the content of the congestion mark item is set to the first mark.

6. The method according to claim 1, further comprising:
   adding an entry corresponding to the packet flow to a congestion-flow flow table.

7. The method according to claim 6, further comprising:
   in response to determining that no packet in the packet flow is received within predetermined duration starting from a moment recorded by a timestamp item in the entry, deleting the entry corresponding to the packet flow, wherein the timestamp item is used to record a moment at which a packet in the packet flow is last received.

8. The method according to claim 6, further comprising:
receiving a third packet; and
in response to determining that an entry corresponding to a second packet flow exists in the congestion-flow flow table, changing a scheduling priority of the third packet, wherein the scheduling priority of the third packet is different from a scheduling priority of a fourth packet, wherein both the fourth packet and the third packet belong to the second packet flow, wherein the third packet is a packet received after the entry corresponding to the second packet flow is added to the congestion-flow flow table, and wherein the fourth packet is a packet received before the entry corresponding to the second packet flow is added to the congestion-flow flow table.

9. A packet control method, comprising:
receiving, by a network node, a congestion isolation message from a downstream node, wherein the congestion isolation message comprises description information; and
reducing, by the network node, a scheduling priority of a packet in the packet flow of the network node, wherein the packet in the packet flow is sent to the downstream node.

10. The method according to claim 9, wherein the reducing a scheduling priority of the packet in the packet flow comprises:
modifying content of a priority indication field of the packet in the packet flow, wherein a scheduling priority corresponding to post-modification content is lower than a scheduling priority corresponding to pre-modification content; or
controlling the packet in the packet flow to enter a low-priority processing queue, wherein a scheduling priority of the low-priority processing queue is lower than a scheduling priority corresponding to content of a priority indication field of the packet in the packet flow.

11. The method according to claim 9, after the receiving a congestion isolation message, further comprising:
setting, to a first mark, content of a congestion mark item in an entry that corresponds to the packet flow and that is in a flow table, wherein the congestion mark item is used to record whether a packet flow corresponding to an entry to which the congestion mark item belongs is a congestion flow, and wherein the first mark is used to indicate that the packet flow corresponding to the entry to which the congestion mark item belongs is a congestion flow.

12. The method according to claim 11, further comprising:
in response to determining that no packet in the packet flow is received within predetermined duration starting from a moment recorded by a timestamp item in the entry, setting the mark item to a second mark, wherein the second mark is used to indicate that the packet flow corresponding to the entry to which the mark item belongs is a non-congestion flow, and wherein the timestamp item is used to record a moment at which a packet in the packet flow is last received.

13. The method according to claim 11, further comprising:
obtaining a first packet; and
in response to determining that content of a congestion mark item in an entry that corresponds to a first packet flow and that is in the flow table is the first mark, changing a scheduling priority of the first packet, wherein the scheduling priority of the first packet is different from a scheduling priority of a second packet, wherein both the second packet and the first packet belong to the first packet flow, wherein the first packet is a packet obtained after the content of the congestion mark item is set to the first mark, and wherein the second packet is a packet obtained before the content of the congestion mark item is set to the first mark.

14. The method according to claim 9, after the receiving a congestion isolation message, further comprising:
adding an entry corresponding to the packet flow to a congestion-flow flow table.

15. The method according to claim 14, further comprising:
in response to determining that no packet in the packet flow is received within predetermined duration starting from a moment recorded by a timestamp item in the entry, deleting the entry corresponding to the packet flow, wherein the timestamp item is used to record a moment at which a packet in the packet flow is last received.

16. The method according to claim 14, further comprising:
obtaining a third packet; and
in response to determining that an entry corresponding to a second packet flow exists in the congestion-flow flow table, changing a scheduling priority of the third packet, wherein the scheduling priority of the third packet is different from a scheduling priority of a fourth packet, wherein both the fourth packet and the third packet belong to the second packet flow, wherein the third packet is a packet obtained after the entry corresponding to the second packet flow is added to the congestion-flow flow table, and wherein the fourth packet is a packet obtained before the entry corresponding to the second packet flow is added to the congestion-flow flow table.

17. A device, comprising:
a memory, configured to store program instructions;
a communications interface, configured to receive and send data; and
at least one processor, configured to invoke the program instructions stored in the memory, wherein the program instructions, when executed by the at least one processor, instruct the at least one processor to:
detect a packet flow causing a congestion status change;
reduce a scheduling priority of a packet in the packet flow of the device, wherein the packet in the packet flow is received from an upstream node;
generate a congestion isolation message, wherein the congestion isolation message is used to change a priority of the packet in the packet flow, and wherein the congestion isolation message comprises description information of the packet flow; and
send the congestion isolation message to the upstream node.

* * * * *